United States Patent [19]

Pickering

[11] 4,325,581

[45] Apr. 20, 1982

[54] VEHICLE LOAD SENSING ARRANGEMENT

[75] Inventor: John F. Pickering, The Green Broadwell, near Rugby, England

[73] Assignee: Lucas Industries Limited, Birmingham, England

[21] Appl. No.: 112,330

[22] Filed: Jan. 15, 1980

[30] Foreign Application Priority Data

Jan. 16, 1979 [GB] United Kingdom ............... 01606/79

[51] Int. Cl.³ .............................................. B60T 8/22
[52] U.S. Cl. .................. 303/22 R; 188/195; 303/6 C
[58] Field of Search ................. 303/22 R, 22 A, 6 C; 188/195, 349; 267/33

[56] References Cited

U.S. PATENT DOCUMENTS

| 2,980,417 | 4/1961 | Pence | 267/33 |
| 3,417,986 | 12/1968 | Fuke | 267/33 |
| 3,709,568 | 1/1973 | Miyake et al. | 303/22 R |
| 4,062,597 | 12/1977 | Sawyer et al. | 303/22 R X |
| 4,150,855 | 4/1979 | Demido | 303/22 R |

FOREIGN PATENT DOCUMENTS

| 1280685 | 7/1972 | United Kingdom . |
| 1313450 | 4/1973 | United Kingdom . |
| 1314286 | 4/1973 | United Kingdom . |
| 1334057 | 10/1973 | United Kingdom . |
| 1449095 | 9/1976 | United Kingdom . |

*Primary Examiner*—Douglas C. Butler
*Attorney, Agent, or Firm*—Scrivener, Clarke, Scrivener and Johnson

[57] ABSTRACT

A vehicle load sensing arrangement comprises an input arrangement to which is applied the force of a road spring and a control valve which may, for example, be a pressure reducing valve, having a movable valve member. A control spring acts in opposition to the road spring and together with a force-reduction arrangement serves to reduce the road spring force so that only a proportion of the road spring force is applied to the valve member the remainder being applied to the sprung part of the vehicle. To reduce the load and size of the control spring, and to thereby reduce the required installation space, the control spring is arranged between the valve member and the force-reduction arrangement and acts against the force transmitted by the force-reduction arrangement, so that the effective force acting on the valve member is the difference between the proportion of the road spring force transmitted by the force-reduction arrangement and the force of the control spring.

8 Claims, 1 Drawing Figure

U.S. Patent  Apr. 20, 1982  4,325,581
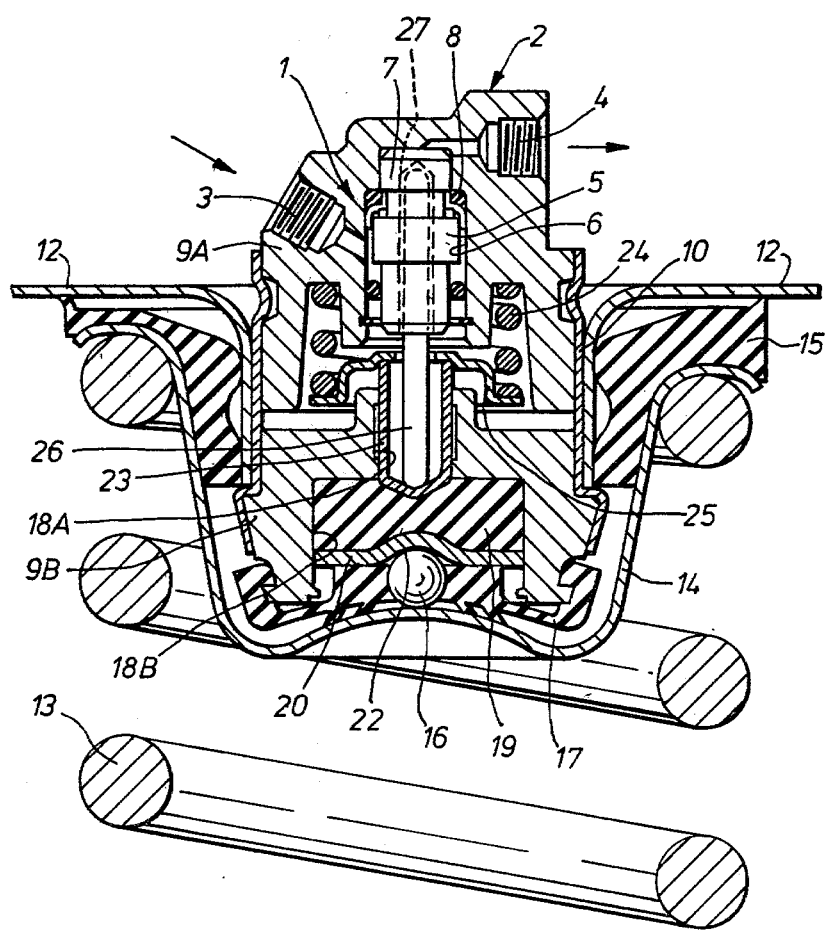

VEHICLE LOAD SENSING ARRANGEMENT

This invention relates to vehicle load sensing arrangements for vehicle braking systems in which the braking pressure effort is varied in dependence upon vehicle loading.

Normally, such braking systems have a brake pressure control valve, in the form of a pressure-reducing or limiting valve, fitted in the brake line between the rear wheel brakes and the source of fluid pressure. The "cut-in" point at which the valves shut off the pressure fluid to the rear wheel brakes or reduce the pressure relative to the pressure applied to the front wheel brakes is often dependent upon the vehicle loading. The lower rear wheel brake pressure provides a resistance to rear wheel brake locking caused by a reduction in tyre-to-road contact forces when the vehicle adopts a nose-down attitude caused by heavy braking, or by certain loading conditions.

The vehicle loading may be sensed by determining relative movement between a sprung and an unsprung part of the vehicle, for example the chassis and the rear axle.

Previously proposed load sensing arrangements comprise a control spring the force of which determines the valve cut-in value for "minimum load" axle position. Only axle deflections above the minimum position are transmitted to the valve and a lever ratio is incorporated which ensures that only a desired proportion of the axle deflection in excess of the minimum position is transmitted to the valve to vary the cut-in point in dependence upon the vehicle suspension deflection.

In a previously proposed load sensing arrangement described in the specification of U.S. Pat. No. 4,062,597, to which attention is directed for a better understanding of the present invention, the control valve has a movable operating member for controlling the flow of pressure fluid through the valve, the valve member being subjected to a force which is dependent upon vehicle loading. In the particular embodiment described in said complete specification there is provided a road spring which applies a force to an input member, a control spring which applies a force to the input member in opposition to the road spring force, and a force-reduction means by which a proportion of the road spring force in excess of the control spring force is applied to the valve member, the remaining force being transmitted to the sprung part of the vehicle. Thus, the valve member is subjected to a force which is substantially less than the road spring force.

The present invention aims to provide an improved load sensing arrangement for use in vehicle braking systems.

In accordance with the invention,, there is provided a load sensing arrangement comprising force-reduction means, input means for transferring a force from a road spring to the force-reduction means, a control valve having a valve operating member which is movable to control the flow of fluid pressure through the valve, the force-reduction means being arranged to apply a proportion of the road spring force to the valve operating member and the remainder to the sprung part of the vehicle, and a resilient control means acting in opposition to the said proportion of the road spring force, the effective force acting on the valve operating member being the difference between the said proportion of the road spring force and the force of the resilient control means.

Because the control resilient means which is preferably a coil compression spring, acts in opposition to only a proportion of the road spring force, rather than the total road spring force, then the control spring may be smaller and have lower spring load than the previously proposed control spring, and requires less installation space. The control valve may be housed in a single sub-assembly which enables easier installation on a vehicle and less assembly time than with the previously proposed arrangement.

A vehicle load sensing arrangement in accordance with the invention for a braking system will now be described, by way of example, with reference to the accompanying drawing which is an axial cross-section of the sensing arrangement.

The sensing arrangement comprises a pressure reducing valve 1 having a housing 2 with an inlet 3 connected in use to a brake master cylinder and an outlet 4 connected in use to the vehicle rear wheel brakes. A stepped valve operating member 5 is sealingly slidable in a bore 6 in the housing and has a valve head 7 which is engageable with one side of a valve seat 8 to shut off communication between the inlet and outlet.

In normal operation the valve member 5 is subjected to an upwardly directed axial force as will be described later. Fluid flows from the inlet 3 past the valve head 7 to the outlet until a cut-in pressure is reached at which the pressure force on the valve member overcomes the axial force to move the valve head 7 against the seat 8 and close the valve. Further increases in inlet pressure cause reciprocation of the piston to meter the flow between the inlet and outlet, as is known.

In the illustrated arrangement the housing 2 is formed in two parts 9A,9B secured together by tubular retaining member 10. The upper housing part 9A contains the control valve 1 as a complete sub-assembly which may be assembled prior to installation on the vehicle. The housing 2 is secured to a frame 12 of the sprung part of the vehicle.

The top of a road spring 13 seats against a cup-shaped seat 14 at the upper end of which is an annular resilient buffer 15 which engages the vehicle frame 12 and which laterally locates the seat 14. At its base the seat 14 has a convex surface engaging a ball 16 which is retained by a rubber boot 17 secured to the bottom of lower housing part 9B. The boot 17 prevents the ingress of dirt and moisture into the housing 2.

The housing part 9B has a step through-bore 18A,18B in the larger, lower part 18B of which is a block 19 of rubber or other elastomeric material which on its lower face engages a plate 20. The plate 20 has a recess 22 in which the ball 16 seats. At its upper face the block 19 engages a cylindrical, bucket-shaped, force-transferring member 23. The lower end of a push rod 26 extends into the member 23 and engages the bottom thereof and the upper end of the push rod 26 engages in a recess 27 in the valve member 5. The force-transferring member 23 is biased downwardly by a control spring 24 which acts between a seat in the upper housing part 9A and a seat 25 which engages the upper end of the force-transferring member.

In operation, the force of road spring 13 is transmitted via the cup-shaped seat 14 and ball 16 to the rubber block 19. The block 19 is urged into the smaller bore portion 18A and acts as a force reducer transmitting to the force-transferring member 23 a force which is a proportion of the spring force, the proportion being dependent upon the cross-sectional areas of the bore portions 18A,18B. The remainder of the road spring force is transmitted through housing 9 to the vehicle frame 12. An effective axial force is applied to the push rod 26, and thus to the valve member 5, the axial force being the difference between the upward force applied to the force-transferring member 23 and the downward force applied by control spring 24.

Said axial force, which determines the operation characteristics of the control valve 1, is thus dependent upon the road spring force, which is itself dependent upon the loading of the vehicle, and upon the pre-stress of the control spring 24.

Because the control spring 24 opposes only a proportion of the road spring force, it can be small, with attendent advantages.

Although described above with a pressure-reducing valve, the arrangement could be used with pressure-limiting valves in which pressure to the rear brakes is cut off completely when the loading on the valve member reaches a predetermined value. Furthermore, the valve member could merely be used to operate an "on-off" valve to pass pressure fluid to pressure conscious brake pressure regulating valve.

The use of the control spring 24 acting on the upper, smaller diameter surface of the block 19 ensures that, when the road spring force is sufficiently reduced, the block rapidly returns to its less compressed state to thereby permit rapid return movement of the push rod 26 and the valve member 5.

I claim:

1. A load sensing arrangement comprising force-reduction means, input means for transferring a force from a road spring to the force-reduction means, a control valve having a valve operating member which is movable to control the flow of fluid pressure through the valve, the force-reduction means being arranged to apply a proportion of the road spring force directly to the valve operating member and through it directly to said control valve, and the remainder of the road spring force to the sprung part of the vehicle, and a resilient control means acting in opposition to the said proportion of the road spring force, the effective force acting directly on the valve operating member being the difference between the said proportion of the road spring force and the force of the resilient control means, said force-reduction means, said input means, said control valve and said resilient control means all being arranged coaxially with respect to one another.

2. A load sensing arrangement according to claim 1, wherein the force-reduction means comprises elastomeric material located in a first bore portion and engaging a force-transferring member located in a second bore portion of smaller cross-section than the first bore portion, the force-transferring member co-operating with the valve member.

3. A load sensing arrangement according to claim 1, wherein the force-reduction means and the control valve are located in a housing.

4. A load sensing arrangement according to claim 3, wherein the housing comprises two separate, but interconnected parts, one part of the housing containing the control valve and the other part containing the force-reduction means.

5. A load sensing arrangement according to claim 4, wherein the control means is located within said one part.

6. A load sensing arrangement according to any of claims 1 to 5, wherein the input means comprises a spring seat engaged by the road spring and a ball member located between the seat and the force-reduction means.

7. A load sensing arrangement according to claim 6, wherein a resilient buffer is located between the spring seat and the vehicle sprung part.

8. A vehicle having a load sensing arrangement according to any of claims 1 to 5 located on the sprung part of the vehicle.

* * * * *